United States Patent
Xie et al.

(10) Patent No.: US 11,834,571 B2
(45) Date of Patent: Dec. 5, 2023

(54) ADDITIVE COMPOSITIONS AND POLYMER COMPOSITIONS COMPRISING THE SAME

(71) Applicant: Milliken & Company, Spartanburg, SC (US)

(72) Inventors: Chunping Xie, Shanghai (CN); Zhenxiao Lu, Shanghai (CN); Shiliang Han, Shanghai (CN)

(73) Assignee: Milliken & Company, Spartanburg, SC (US)

( * ) Notice: Subject to any disclaimer, the term of this patent is extended or adjusted under 35 U.S.C. 154(b) by 521 days.

(21) Appl. No.: 16/170,233

(22) Filed: Oct. 25, 2018

(65) Prior Publication Data
US 2019/0136028 A1 May 9, 2019

Related U.S. Application Data

(60) Provisional application No. 62/583,603, filed on Nov. 9, 2017.

(51) Int. Cl.

| | | |
|---|---|---|
| *C08L 23/14* | (2006.01) | |
| *C08F 210/06* | (2006.01) | |
| *C08K 5/1575* | (2006.01) | |
| *C08J 3/22* | (2006.01) | |
| *B29C 49/04* | (2006.01) | |
| *B29C 49/00* | (2006.01) | |
| *C08L 23/08* | (2006.01) | |
| *B29K 105/00* | (2006.01) | |
| *B29K 101/12* | (2006.01) | |

(52) U.S. Cl.
CPC .......... *C08L 23/14* (2013.01); *B29C 49/0005* (2013.01); *B29C 49/04* (2013.01); *C08F 210/06* (2013.01); *C08J 3/226* (2013.01); *C08K 5/1575* (2013.01); *C08L 23/08* (2013.01); *B29K 2101/12* (2013.01); *B29K 2105/0005* (2013.01); *C08L 2205/025* (2013.01); *C08L 2310/00* (2013.01)

(58) Field of Classification Search
CPC ...................................... C08L 23/14
See application file for complete search history.

(56) References Cited

U.S. PATENT DOCUMENTS

| | | | | |
|---|---|---|---|---|
| 2,393,863 | A * | 1/1946 | Clayton | C08J 7/044 428/523 |
| 3,478,475 | A * | 11/1969 | Strack | B60J 10/70 52/309.3 |
| 4,460,445 | A * | 7/1984 | Rekers | C08K 5/06 252/404 |
| 5,049,605 | A * | 9/1991 | Rekers | C07D 493/04 524/108 |
| 6,238,615 | B1 * | 5/2001 | Kobayashi | C08J 5/00 264/537 |
| 8,003,720 | B2 * | 8/2011 | Keegan | C08K 5/1575 524/109 |
| 8,022,133 | B2 * | 9/2011 | Xu | C08L 23/10 524/528 |
| 8,445,087 | B2 * | 5/2013 | Hansen | C08K 5/0083 525/240 |
| 2002/0028864 | A1 * | 3/2002 | Kobayashi | C08K 5/1575 524/109 |
| 2004/0122196 | A1 | 6/2004 | Pierini et al. | |
| 2006/0173108 | A1 * | 8/2006 | Xu | C08K 5/1575 524/108 |
| 2017/0088689 | A1 * | 3/2017 | Van Mierloo | C08K 5/37 |

FOREIGN PATENT DOCUMENTS

| | | |
|---|---|---|
| JP | 2013-216814 A | 10/2013 |
| JP | 2013216814 * | 10/2013 |
| WO | WO 2006/083640 A1 | 8/2006 |
| WO | WO 2006/083642 A1 | 8/2006 |
| WO | WO 2010/077799 A1 | 7/2010 |

OTHER PUBLICATIONS

KRATON flyer (Year: 2010).*
PCT/US2018/057452 International Search Report, filed Oct. 25, 2018, 5 pages.
PCT/US2018/057452 Written Opinion of the International Searching Authority, filed Oct. 25, 2018, 12 pages.

* cited by examiner

*Primary Examiner* — Irina Krylova
(74) *Attorney, Agent, or Firm* — Robert M. Lanning

(57) ABSTRACT

An additive composition comprises an impact modifier, an acetal compound, and a co-additive compound. An additive composition comprises a plurality of first particles and second particles. The first particles comprise an impact modifier. The second particles comprise a thermoplastic polymer, an acetal compound, and a co-additive. A polymer composition comprises a thermoplastic polymer, an impact modifier, an acetal compound, and a co-additive.

7 Claims, No Drawings

ADDITIVE COMPOSITIONS AND POLYMER COMPOSITIONS COMPRISING THE SAME

CROSS-REFERENCE TO RELATED PATENT APPLICATIONS

This application claims, pursuant to 35 U.S.C. § 119(e), priority to and the benefit of the filing date of U.S. Patent Application No. 62/583,603 filed on Nov. 9, 2017, the contents of which are hereby incorporated by reference.

TECHNICAL FIELD OF THE INVENTION

This application relates to additive compositions for increasing the impact resistance and improving the optical properties of thermoplastic polymer compositions. The application also relates to polymer compositions containing such additive compositions and methods for making such polymer compositions.

BACKGROUND

Polyolefins are semicrystalline polymers. A polyolefin which has been allowed to cool relatively slowly (e.g., such as the cooling that takes place during the production of molded plastic parts) contains amorphous regions in which the polymer chains are randomly arranged and crystalline regions in which the polymer chains have assumed an orderly configuration. Within these crystalline regions of the polyolefin, the polymer chains align into domains commonly referred to as "crystalline lamellae." Under normal processing conditions, the crystalline lamellae grow radially in all directions as the polyolefin polymer cools from the molten state. This radial growth results in the formation of spherulites, which are spherical semicrystalline regions composed of multiple crystalline lamellae interrupted by amorphous regions. The size of the spherulites is affected by several parameters and can range from hundreds of nanometers to millimeters in diameter. When the spherulite size is appreciably larger than the wavelength of visible light, the spherulites will scatter visible light passing through the polymer. This scattering of visible light results in a hazy appearance which is commonly referred to as "polymer haze" or simply "haze." While appreciable levels of polymer haze may be acceptable in some applications, there are certain applications (e.g., storage containers) in which consumers desire relatively transparent plastics, which requires correspondingly low haze levels.

Over the years, several polymer additives have been developed to reduce spherulite size in polyolefin polymers. For example, bis(3,4-dimethylbenzylidene)sorbitol has enjoyed much commercial success because of its ability to deliver relatively low levels of haze in polypropylene polymers. However, polymers clarified with bis(3,4-dimethylbenzylidene)sorbitol are not without their limitations. For example, while such polymers exhibit desirably low levels of haze, the polymers typically do not exhibit good impact resistance at lower temperatures. This low impact resistance limits the utility of such polymers in, for example, cold storage applications.

Thus, a need remains for additives that can produce desirably low haze levels and good impact resistance in a wide range of polyolefin polymers. A need also remains for polymer compositions incorporating such additives and exhibiting desirably low haze levels and good impact resistance. The various embodiments described herein seek to provide such additives and compositions.

BRIEF SUMMARY OF THE INVENTION

In a first embodiment, the invention provides an additive composition comprising:
(a) an impact modifier;
(b) an acetal compound of Formula (I)

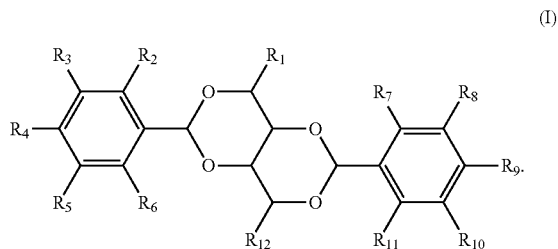

(I)

wherein $R_1$ is selected from the group consisting of hydrogen, alkyl groups, alkenyl groups, hydroxyalkyl groups, alkoxy groups, and alkyl halide groups; $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, carboxyl groups, and halogens; and $R_{12}$ is a hydroxyalkyl group selected from the group consisting of —$CH_2OH$ and —$CH(OH)CH_2OH$; and
(c) a co-additive compound selected from the group consisting of polyethylene glycols, copolymers of a diol and a $C_4$-$C_{10}$ dicarboxylic acid, polyethylenimines, and mixtures thereof.

In a second embodiment, the invention provides an additive composition comprising:
(a) a plurality of first particles, the first particles comprising an impact modifier; and
(b) a plurality of second particles, the second particles comprising:
(i) a thermoplastic polymer;
(ii) an acetal compound of Formula (I)

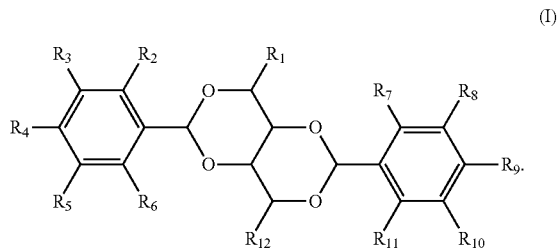

(I)

wherein $R_1$ is selected from the group consisting of hydrogen, alkyl groups, alkenyl groups, hydroxyalkyl groups, alkoxy groups, alkyl halide groups, and derivatives thereof; $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, carboxyl groups, and halogens; and $R_{12}$ is a hydroxyalkyl group selected from the group consisting of —$CH_2OH$ and —$CH(OH)CH_2OH$; and
(iii) a co-additive compound selected from the group consisting of polyethylene glycols, copolymers of a diol and a $C_4$-$C_{10}$ dicarboxylic acid, polyethylenimines, and mixtures thereof.

In a third embodiment, the invention provides a polymer composition comprising:
(a) a thermoplastic polymer;
(b) an impact modifier;
(c) an acetal compound of Formula (I)

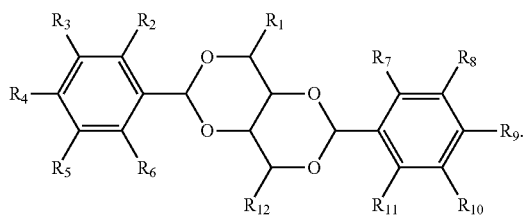

(I)

wherein $R_1$ is selected from the group consisting of hydrogen, alkyl groups, alkenyl groups, hydroxyalkyl groups, alkoxy groups, alkyl halide groups, and derivatives thereof; $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, carboxyl groups, and halogens; and $R_{12}$ is a hydroxyalkyl group selected from the group consisting of —$CH_2OH$ and —$CH(OH)CH_2OH$; and
(d) a co-additive compound selected from the group consisting of polyethylene glycols, copolymers of a diol and a $C_4$-$C_{10}$ dicarboxylic acid, polyethylenimines, and mixtures thereof.

In a fourth embodiment, the invention provides a method for molding a polymer composition. In particular, the method comprises the steps of:
(a) providing an apparatus comprising a die and a mold cavity, the mold cavity having an interior surface defining a shape for a molded article;
(b) providing a polymer composition comprising:
  (i) a thermoplastic polymer;
  (ii) a polymer additive selected from the group consisting of nucleating agents, clarifying agents, and combinations thereof; and
  (iii) an impact modifier;
(c) heating the polymer composition to a temperature sufficient to melt the polymer composition so that it may be extruded through the die;
(d) extruding the molten polymer composition through the die to form a parison;
(e) capturing the parison in the mold cavity;
(f) blowing a pressurized fluid into the parison under sufficient pressure to inflate the parison so that it conforms to the interior surface of the mold cavity and produces a molded article;
(g) allowing the molded article to cool to a temperature at which the polymer composition at least partially solidifies so that the molded article retains its shape; and
(h) removing the molded article from the mold cavity.

DETAILED DESCRIPTION OF THE INVENTION

In a first embodiment, the invention provides an additive composition comprising an impact modifier, an acetal compound, and a co-additive compound.

As utilized herein, the term "impact modifier" is used to refer to materials that are added to plastics in order to improve the durability and toughness of the plastics. The additive composition of the invention can contain any suitable impact modifier. In a preferred embodiment, the impact modifier is selected from the group consisting of ethylene/alpha-olefin copolymers, ethylene/alpha-olefin terpolymers, ethylene/alpha-olefin block copolymers, ethylene-propylene rubbers, ethylene-propylene diene rubbers, propylene/alpha-olefin copolymers, silicone rubbers, styrene-butadiene block copolymers, styrene-ethylene/butylene-styrene block copolymers, styrene-ethylene/propylene-styrene block copolymers, and mixtures thereof. In another preferred embodiment, the impact modifier is an ethylene-propylene rubber. In yet another preferred embodiment, the impact modifier is a styrene-ethylene/butylene-styrene block copolymer. Preferably, the impact modifier has a refractive index that is substantially equal to the refractive index of the polymer to which the additive composition will be added. More preferably, the refractive index of the impact modifier is within 0.01 units of the refractive index of the polymer to which the additive composition will be added.

In a preferred embodiment, the impact modifier is selected from the group consisting of selectively hydrogenated styrene-diene block copolymers in which only the diene block is hydrogenated. The selectively hydrogenated styrene block copolymers suitable for use in the present invention are generally those containing blocks of polymerized monoalkenyl aromatic hydrocarbon monomers units (S) and a hydrogenated diene block (polymerized conjugated diolefin monomer) (HD). The S block is a glassy block typically at the terminal end of the block copolymer. The S block can be a polymeric block containing monomers selected from the group consisting of styrene, alpha-methylstyrene, para-methylstyrene, ortho-methylstyrene, para-tertbutylstyrene, dimethy-styrene, and mixtures of two or more of these. The hydrogenated diene block can be a polymeric block comprising hydrogenated polybutadiene, hydrogenated polyisoprene, hydrogenated polypentadiene, hydrogenated polyhexadiene, or mixtures of 2 or more of these. The HD block is a rubber and is typically not at the terminal end of the block copolymer and is commonly referred to as a rubber midblock. The more common hydrogenated rubber blocks are hydrogenated polybutadiene, hydrogenated polyisoprene, and hydrogenated isoprene-butadiene copolymer. When the polybutadiene block is hydrogenated it creates a block of ethylene-butylene copolymer where the ratio of the ethylene and butylene depends upon the microstructure (or vinyl content) of the polybutadiene. The vinyl content is a measure of the amount of 1,2-addition occurring during butadiene polymerization and can be carefully controlled. A preferred ratio of ethylene to butylene is about 40 wt. % butylene to achieve low modulus and a low glass transition of around −55° C. as measured by DSC.

In general, any selectively hydrogenated block copolymers comprising at least one polymeric block containing predominantly polymerized monoalkenyl aromatic hydrocarbon monomer units and at least one polymeric block containing predominantly polymerized conjugated diolefin monomer units, which are hydrogenated after incorporation into the polymer, may be used as the impact modifier in the compositions of the invention. Suitable hydrogenated block copolymers may be prepared by hydrogenating a block copolymer prepared in accordance with techniques well known in the art such as those described in U.S. Pat. Nos. 3,231,635; 3,265,765; 3,322,856; 4,426,495 and 4,444,953, the disclosure of which patents are incorporated herein by reference. In general, block copolymers which may be hydrogenated to form the desired hydrogenated block copolymer will have one of the following general formulae: S-HD-S or (S-HD)x-Z, where x can be a value of 1 to 20 (providing diblocks, triblocks, or multiarm polymers) and Z is a coupling agent. In general, each polymeric S block has a weight average molecular weight of about 4,000 g/mol to about 50,000 g/mol, and each hydrogenated polymeric rubber block (HD) has an average molecular weight of about 10,000 g/mol to about 200,000 g/mol. When the block copolymer has more than one polymeric S block, each S block can have a weight average molecular weight independently selected from the range provided above, or each S block can have approximately the same weight average molecular weight selected from the range provided above. In a preferred embodiment, each polymeric block S has approximately the same weight average molecular weight which is within the range of about 5,000 g/mol to about 10,000 g/mol, and each polymeric hydrogenated HD block has an average molecular weight of about 25,000 g/mol to about 100,000 g/mol.

The block copolymer composition of the present invention may also comprise a polyethylene copolymer. Examples of suitable polyethylene copolymers are poly(ethylene octene) copolymers such as Engage 8402 from Dow Chemical and Exact 0203 from Exxon Chemical. In this embodiment, the selectively hydrogenated block copolymer may be replaced by up to 50% of a polyethylene copolymer, such as a polyethylene copolymer that substantially matches the random polypropylene copolymer into which the additive composition will be incorporated. The polyethylene copolymer should have a density close to 0.9 g/cm$^3$ so it can closely match the refractive index of the polypropylene or polypropylene random copolymer. Preferably the polyethylene copolymer has an average refractive index within 0.008 units of the refractive index of the polypropylene or polypropylene copolymer into which the additive composition will be incorporated.

As used herein, the "molecular weight" of the block copolymer refers to the true molecular weight in g/mol of the block copolymer or a block of the block copolymer. The molecular weight of the block copolymer can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of block copolymers measured using GPC so calibrated are styrene equivalent molecular weights. The styrene equivalent molecular weight may be converted to true molecular weight when the styrene content of the polymer and the vinyl content of the diene segments are known. The detector used on the gel permeation chromatography instrument is preferably a combination ultraviolet and refractive index detector. The molecular weights for the block copolymers expressed herein are measured at the peak of the GPC trace, converted to true molecular weights, and are commonly referred to as "peak molecular weights".

In general, the selectively hydrogenated block copolymers described above may be selectively hydrogenated using any of the methods known in the prior art suitable for such hydrogenation. In general, the conditions used to hydrogenate the block copolymers will be selected to ensure that at least 50%, preferably at least 80%, and most preferably at least 95% of the ethylenic unsaturation remaining in the conjugated diolefin polymer blocks after preparation is saturated as a result of the hydrogenation. The hydrogenation conditions will also be selected so as to ensure that less than 20%, preferable less than 10%, and mostly preferably less than 5% of the aromatic unsaturation in the monoalkenyl aromatic hydrocarbon polymer blocks is hydrogenated. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal, such as nickel or cobalt, which is combined with a suitable reducing agent. Suitable reducing agents for the catalyst (or catalyst precursor) include aluminum alkyl or hydride of a metal selected from Groups I-A, II-A, and III-B of the Periodic Table of the Elements, with lithium, magnesium, and aluminum being particularly preferred. This preparation can be accomplished in a suitable solvent or diluent at a temperature from about 20° C. to about 80° C. Other catalysts that are useful include titanium based catalyst systems.

Once the hydrogenation is complete, it is preferable to extract the catalyst by stirring with the polymer solution a relatively large amount of aqueous acid (preferably 20-30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

Suitable selectively hydrogenated styrene block copolymers are selected from the group consisting of hydrogenated styrene-butadiene-styrene (S-B-S), hydrogenated styrene-isoprene-styrene (S-I-S), and mixtures thereof. Preferably, the styrene block copolymer is a styrene-ethylene/butylene-styrene copolymer (S-E/B-S). The ethylene/butylene block (EB) results from the selective hydrogenation of the butadiene block of a styrene-butadiene-styrene block copolymer. Hydrogenation of the diene block of a styrene-isoprene-styrene clock copolymer (S-I-S) results in a styrene-ethylene/propylene-styrene block copolymer (S-E/P-S). The amount of styrene and the amount of hydrogenated rubber midblock can be varied to craft various refractive indices to match almost any propylene polymer, propylene copolymer, or propylene composition. Alternatively, two or more selectively hydrogenated styrene block copolymers with substantially the same structure and chemical composition in the respective blocks but different styrene contents in the overall polymer can be melt blended together at temperatures typically above 180° C. to produce a molecularly compatible, clear, and intimate blend which will exhibit a refractive index which is the average of the blended polymers depending upon the styrene contents and weight percentages. In addition to melt mixing, one can also solution mix these polymers in a suitable solvent to achieve the same result.

The impact modifier can be present in the additive composition in any suitable amount. Preferably, the impact modifier is present in the additive composition in an amount of about 10 wt. % or more, or about 30 wt. % or more based on the total weight of the additive composition. In another preferred embodiment, the impact modifier is present in the additive composition in an amount of about 99.8 wt. % or less based on the total weight of the additive composition. Thus, in a preferred embodiment, the impact modifier is present in the additive composition in an amount of about 10 wt. % to about 99.8 wt. %, or about 30 wt. % to about 99.8 wt. % based on the total weight of the additive composition.

As noted above, the additive composition of the invention further comprises an acetal compound. The acetal compound present in the additive composition can be any suitable acetal compound. For example, the acetal compound can be the product of the reaction between an alditol and a benzaldehyde. The alditol compound can be an unsubstituted alditol (e.g., xylitol or sorbitol) or a substituted alditol (e.g., 1,2,3-trideoxynonitol or 1,2,3-trideoxynon-1-enitol). The benzaldehyde compound can be an unsubsituted benzaldehyde or a substituted benzaldehyde (e.g., 3,4-dimethylbenzaldehyde or 4-propylbenzaldehyde). Furthermore, the acetal compound produced by the reaction can be a mono-acetal, di-acetal, or tri-acetal compound (i.e., a compound containing one, two, or three acetal groups, respectively).

In certain embodiments, the acetal compound can be an acetal compound conforming to the structure of Formula (I):

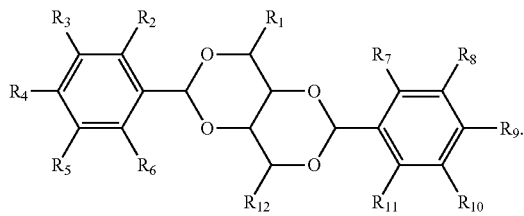

(I)

In the structure of Formula (I), $R_1$ is selected from the group consisting of hydrogen, alkyl groups, alkenyl groups, hydroxyalkyl groups, alkoxy groups, alkyl halide groups, and derivatives thereof. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, carboxyl groups, and halogens. $R_{12}$ is a hydroxyalkyl group selected from the group consisting of —$CH_2OH$ and —$CH(OH)CH_2OH$.

In certain embodiments of the invention, $R_1$ is selected from the group consisting of alkyl groups and alkenyl groups, $R_2$, $R_3$, $R_5$, $R_6$, $R_7$, $R_8$, $R_{10}$, and $R_{11}$ are each hydrogen, $R_{12}$ is —$CH(OH)CH_2OH$, and $R_4$ and $R_9$ are each alkyl groups. In a more specific embodiment, $R_1$ is an n-propyl group, $R_2$, $R_3$, $R_5$, $R_6$, $R_7$, $R_8$, $R_{10}$, and $R_{11}$ are each hydrogen, $R_{12}$ is —$CH(OH)CH_2OH$, and $R_4$ and $R_9$ are each n-propyl groups.

In other embodiments of the invention, $R_1$ is hydrogen, $R_2$, $R_5$, $R_6$, $R_7$, $R_8$, and $R_{11}$ are each hydrogen, $R_3$, $R_4$, $R_9$, and $R_{10}$ are each alkyl groups, and $R_{12}$ is —$CH(OH)CH_2OH$. In a more specific embodiment, $R_1$ is hydrogen, $R_2$, $R_5$, $R_6$, $R_7$, $R_8$, and $R_{11}$ are each hydrogen, $R_3$, $R_4$, $R_9$, and $R_{10}$ are each methyl groups, and $R_{12}$ is —$CH(OH)CH_2OH$.

In certain embodiments of the invention, the acetal compound can be the product of the reaction between a $C_1$-substituted alditol and a benzaldehyde. As utilized herein, the term "$C_1$-substituted alditol" is used to refer to a compound in which a terminal carbon of an alditol (e.g., a terminal carbon atom which typically is substituted with a single hydroxyl group) is substituted with an additional group. The $C_1$-substituted alditol can be substituted with any suitable group. In certain embodiments, the $C_1$-substituted alditol can be substituted with a group selected from the group consisting of alkyl groups, alkenyl groups, alkoxy groups, hydroxy alkyl groups, alkyl halide groups, and derivatives thereof. The benzaldehyde can be any suitable benzaldehyde, including both unsubstituted and substituted benzaldehydes. In certain embodiments, the benzaldehyde can be substituted with one or more groups selected from the group consisting of alkyl groups, alkenyl groups, alkoxy groups, carboxyl groups, halogens, and aryl groups (e.g., phenyl groups). Suitable acetal compounds derived from the reaction between a $C_1$-substituted alditol and a benzaldehyde include, but are not limited to, the acetal compounds disclosed in U.S. Pat. Nos. 7,157,510 and 7,262,236, each of which is hereby incorporated by reference in its entirety.

Thus, in certain embodiments, the acetal compound can be a di-acetal compound conforming to the structure of Formula (II) below

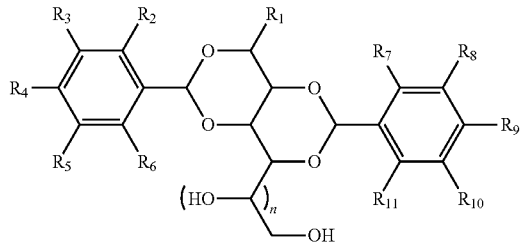

(II)

In Formula (II), n is 0, 1, or 2, and $R_1$ is selected from the group consisting alkyl groups, alkenyl groups, alkoxy groups, hydroxy alkyl groups, alkyl halide groups, and derivatives thereof. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkenyl groups, alkoxy groups, carboxyl groups, halogens, and phenyl groups. In certain embodiments, n is 1, $R_1$ is an alkyl group (e.g., an n-propyl group), $R_4$ and $R_9$ are alkyl groups (e.g., n-propyl groups), and $R_2$, $R_4$, $R_5$, $R_6$, $R_7$, $R_9$, $R_{10}$ and $R_{11}$ are each hydrogen.

The acetal compound can be present in the additive composition in any suitable amount. Preferably, the acetal compound is present in the additive composition in an amount of about 0.015 wt. % or more based on the total weight of the additive composition. In another preferred embodiment, the acetal compound is present in the additive composition in an amount of about 50 wt. % or less based on the total weight of the additive composition. Thus, in a preferred embodiment, the acetal compound is present in the additive composition in an amount of about 0.015 wt. % to about 50 wt. % based on the total weight of the additive composition.

As noted above, the additive composition of the invention comprises a co-additive compound in addition to the impact modifier and the acetal compound. The co-additive compound present in the additive composition can be any suitable compound that works synergistically with the impact modifier and the acetal compound to enable the production of polymer compositions exhibiting low haze and increased impact resistance, especially at cold temperatures. Preferably, the co-additive compound is selected from the group consisting of polyethylene glycols, polyethylenimines, copolymers of a diol and a $C_4$-$C_{10}$ dicarboxylic acid, and mixtures thereof. Polyethylene glycols suitable for use as the co-additive include any suitable polyethylene glycol compound. In a preferred embodiment, the co-additive compound is selected from the group consisting of polyethylene glycols having a molar mass of about 500 g/mol to about 5,000 g/mol. In a preferred embodiment, the co-additive is a copolymer of a diol and a $C_4$-$C_{10}$ dicarboxylic acid, such as a copolymer of diethylene glycol and adipic acid (e.g., poly[di(ethylene glycol) adipate]). These copolymers preferably have a molar mass of about 300 g/mol or more, and preferably have a molar mass of about 10,000 g/mol or less. Polyethylenimines suitable for use as co-additive compounds on the invention include linear and branched polyethylenimines having a molar mass of about 500 g/mol or more. Preferably, the polyethylenimine is a branched polyethylenimine having a molar mass of about 1,000 g/mol to about 10,000 g/mol, more preferably about 2,500 g/mol to about 5,000 g/mol.

The co-additive compound can be present in the additive composition in any suitable amount. Preferably, the co-additive compound is present in the additive composition in an amount of about 0.03 wt. % or more based on the total weight of the additive composition. In another preferred embodiment, the co-additive compound is present in the additive composition in an amount of about 50 wt. % or less based on the total weight of the additive composition. Thus, in a preferred embodiment, the co-additive compound is present in the additive composition in an amount of about 0.03 wt. % to about 50 wt. % based on the total weight of the additive composition.

In a second embodiment, the invention provides an additive composition comprising a plurality of first particles and a plurality of second particles. As utilized in connection with this second embodiment, the term "particle" is used to refer to a discrete body (e.g., a pellet, flake, prill, etc.) having any suitable shape (e.g., substantially spherical, substantially cylindrical, etc.) and size. Preferably, the particles have a substantially spherical or cylindrical shape and a diameter/length in the micron to millimeter range (e.g., 50 μm to about 5 mm in diameter).

The first particles present in the additive composition (i.e., the additive composition of the second embodiment) preferably comprise an impact modifier. The first particles can comprise any suitable impact modifier, including any of those described above in connection with the first additive composition of the invention. In a preferred embodiment, the impact modifier present in the first particles is an ethylene-propylene rubber. In another preferred embodiment, the impact modifier present in the first particles is a selectively hydrogenated styrene-diene block copolymer such as those discussed in connection with the first additive composition of the invention. In a more preferred embodiment, the impact modifier present in the first particles is a styrene-ethylene/butylene-styrene block copolymer.

The first particles can comprise any suitable amount of the impact modifier. Preferably, the impact modifier is present in the first particles in an amount of about 95 wt. % or more based on the total weight of the first particles.

The second particles present in the additive composition (i.e., the additive composition of the second embodiment) preferably comprise (i) a thermoplastic polymer, (ii) an acetal compound, and (iii) a co-additive compound. The acetal compound present in the second particles can be any suitable acetal compound, including any of those described above in connection with the first additive composition of the invention. Preferably, the acetal compound is a compound of Formula (I) as described above in connection with the first additive composition of the invention. The co-additive compound present in the second particles can be any suitable co-additive compound, including any of those described above in connection with the first additive composition of the invention.

As noted above, the second particles comprise a thermoplastic polymer in addition to the acetal compound and the co-additive compound. The thermoplastic polymer present in the second particles can be any suitable thermoplastic polymer or mixture of thermoplastic polymers. Preferably, the thermoplastic polymer is a polyolefin polymer. The polyolefin polymer can be any suitable polyolefin, such as a polypropylene, a polyethylene, a polybutylene, a poly(4-methyl-1-pentene), and a poly(vinyl cyclohexane). In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 wt. % to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 wt. % to about 25 wt. %. The polyolefin polymers described above can be branched or cross-linked, such as the branching or cross-linking that results from the addition of additives that increase the melt strength of the polymer. In a preferred embodiment, the thermoplastic polymer is selected from the group consisting of polypropylene homopolymers, polypropylene random copolymers, polypropylene impact copolymers, and mixtures thereof.

The second particles can comprise any suitable amounts of the thermoplastic polymer, acetal compound, and co-additive compound. Preferably, the thermoplastic polymer is present in the second particles in an amount of about 20 wt. % or more based on the total weight of the second particles. In another preferred embodiment, the thermoplastic polymer is present in the second particles in an amount of about 80 wt. % or less based on the total weight of the second particles. Thus, in a preferred embodiment, the thermoplastic polymer is present in the second particles in an amount of about 20 wt. % to about 80 wt. % based on the total weight of the second particles. Preferably, the acetal compound is present in the second particles in an amount of about 20 wt. % or more based on the total weight of the second particles. In another preferred embodiment, the acetal compound is present in the second particles in an amount of about 80 wt. % or less based on the total weight of the second particles. Thus, in another preferred embodiment, the acetal compound is present in the second particles in an amount of about 20 wt. % to about 80 wt. % based on the total weight of the second particles. Preferably, the co-additive compound is present in the second particles in an amount of about 4 wt. % or more based on the total weight of the second particles. In another preferred embodiment, the co-additive compound is present in the second particles in an amount of about 80 wt. % or less based on the total weight of the second particles. Thus, in a preferred embodiment, the co-additive compound is present in the second particles in an amount of about 4 wt. % to about 80 wt. % based on the total weight of the second particles.

In a third embodiment, the invention provides a polymer composition comprising a thermoplastic polymer, an impact modifier, an acetal compound, and a co-additive compound. The thermoplastic polymer present in the polymer composition can be any suitable thermoplastic polymer. Preferably, the thermoplastic polymer is a polyolefin polymer. The polyolefin polymer can be any suitable polyolefin, such as a polypropylene, a polyethylene, a polybutylene, a poly(4-methyl-1-pentene), and a poly(vinyl cyclohexane). In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 wt. % to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 wt. % to about 25 wt. %. The polyolefin polymers described above can be branched or cross-linked, such as the branching or cross-linking that results from the addition of additives that increase the melt strength of the polymer. In a preferred embodiment, the thermoplastic polymer is selected from the group consisting of polypropylene homopolymers, polypropylene random copolymers, polypropylene impact copolymers, and mixtures thereof.

The thermoplastic polymer can be present in the polymer composition in any suitable amount. Preferably, the thermoplastic polymer is present in the polymer composition in an amount of about 50 wt. % or more, about 60 wt. % or more, or about 65 wt. % or more based on the total weight of the polymer composition. In a preferred embodiment, the thermoplastic polymer is present in the polymer composition in an amount of about 99 wt. % or less based on the total weight of the polymer composition. Thus, in a preferred embodiment, the thermoplastic polymer is present in the polymer composition in an amount of about 50 wt. % to about 99 wt. %, about 60 wt. % to about 99 wt. %, or about 65 wt. % to about 99 wt. % based on the total weight of the polymer composition.

The impact modifier present in the polymer composition can be any suitable impact modifier, including any of those discussed above in connection with the first additive composition of the invention. The impact modifier can be present in the polymer composition in any suitable amount. Preferably, the impact modifier is present in the polymer composition in an amount of about 1 wt. % or more based on the total weight of the polymer composition. In another preferred embodiment, the impact modifier is present in the polymer composition in an amount of about 30 wt. % or less based on the total weight of the polymer composition. Thus, in a preferred embodiment, the impact modifier is present in the polymer composition in an amount of about 1 wt. % to about 30 wt. % based on the total weight of the polymer composition.

The acetal compound present in the polymer composition can be any suitable acetal compound, including any of those described above in connection with the first additive composition of the invention. The acetal compound can be present in the polymer composition in any suitable amount. Preferably, the acetal compound is present in the polymer composition in an amount of about 0.05 wt. % or more based on the total weight of the polymer composition. In another preferred embodiment, the acetal compound is present in the polymer composition in an amount of about 1 wt. % or less or about 0.7 wt. % or less based on the total weight of the polymer composition. Thus, in a preferred embodiment, the acetal compound is present in the polymer composition in an amount of about 0.05 wt. % to about 1 wt. % or about 0.05 wt. % to about 0.7 wt. % based on the total weight of the polymer composition.

The co-additive compound present in the polymer composition can be any suitable co-additive compound, including any of those described above in connection with the first additive composition of the invention. The co-additive compound can be present in the polymer composition in any suitable amount. Preferably, the co-additive compound is present in the polymer composition in an amount of about 0.01 wt. % or more based on the total weight of the polymer composition. In another preferred embodiment, the co-additive compound is present in the polymer composition in an amount of about 1 wt. % or less based on the total weight of the polymer composition. Thus, in a preferred embodiment, the co-additive compound is present in the polymer composition in an amount of about 0.01 wt. % to about 1 wt. % based on the total weight of the polymer composition.

The polymer composition of the invention can be produced by any suitable method. For example, the polymer composition can be produced by mixing an appropriate amount of each individual component (i.e., thermoplastic polymer, impact modifier, acetal compound, and co-additive compound) to produce the desired composition. If desired, such mixture can then be extruded to consolidate the individual components into a compounded polymer composition. The polymer composition can also be produced by adding an additive composition as described above to a thermoplastic polymer to produce the desired composition. Again, the resulting mixture can then be extruded to consolidate the components into a compounded polymer composition.

The polymer composition of the invention can be used to produce any suitable thermoplastic article using any technique suited to the processing of thermoplastic polymer compositions. Suitable articles include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like. The polyolefin compositions can be formed into the desired thermoplastic article by any suitable technique, such as injection molding, injection rotational molding, blow molding (e.g., extrusion blow molding, injection blow molding, or injection stretch blow molding), extrusion (e.g., sheet extrusion, film extrusion, cast film extrusion, or foam extrusion), thermoforming, rotomolding, film blowing (blown film), film casting (cast film), and the like.

The polymer composition of the invention is believed to be particularly well-suited to use in extrusion blow molding processes. Thus, in another embodiment, the invention provides a method for molding the polymer composition by an extrusion blow molding process. In particular, the invention provides a method for molding a polymer composition, the method comprising the steps of:
(a) providing an apparatus comprising a die and a mold cavity, the mold cavity having an interior surface defining a shape for a molded article;
(b) providing a polymer composition comprising:
    (i) a thermoplastic polymer;
    (ii) an impact modifier;
    (iii) a polymer additive selected from the group consisting of nucleating agents, clarifying agents, and combinations thereof; and
    (iv) a co-additive compound;
(c) heating the polymer composition to a temperature sufficient to melt the polymer composition so that it may be extruded through the die;
(d) extruding the molten polymer composition through the die to form a parison;
(e) capturing the parison in the mold cavity;
(f) blowing a pressurized fluid into the parison under sufficient pressure to inflate the parison so that it conforms to the interior surface of the mold cavity and produces a molded article;
(g) allowing the molded article to cool to a temperature at which the polymer composition at least partially solidifies so that the molded article retains its shape; and
(h) removing the molded article from the mold cavity.

In the method described above, the polymer composition can be any of the polymer compositions described above and can contain any suitable combination of the thermoplastic polymers, impact modifiers, acetal compounds, and co-additive compounds described above. Further, the polymer composition can be produced using any of the methods described above, such as mixing the individual components in an extruder or mixing the thermoplastic polymer with an additive composition as described above in an extruder. Alternatively, the materials (i.e., individual components or polymer and additive composition) can be mixed prior to introduction into the extruder.

The polymer composition can contain any suitable nucleating agent, clarifying agent, or combination thereof. As utilized herein, the term "nucleating agent" is used to refer to additives that form nuclei or provide sites for the formation and/or growth of crystals in a polymer as it solidifies from a molten state. If present, the nucleating agent in the polymer composition can be any suitable nucleating agent. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate and calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

If present in the polymer composition, the nucleating agent can be present in any suitable amount. As will be understood by those of ordinary skill in the art, the amount of nucleating agent suitable for use in the polymer composition will depend upon several factors, such as the composition of the nucleating agent and the desired properties of the polymer composition. For example, the nucleating agent can be present in the polymer composition in an amount of about 0.01 wt. % or more, about 0.05 wt. % or more, about 0.075 wt. % or more, or about 0.1 wt. % or more, based on the total weight of the polymer composition. The nucleating agent can be present in the polymer composition in an amount of about 1 wt. % or less, about 0.5 wt. % or less, about 0.4 wt. % or less, or about 0.3 wt. % or less. In certain possibly preferred embodiments, the nucleating agent is present in the polymer composition in an amount of from about 0.01 to about 1 wt. %, about 0.05 to about 0.5 wt. %, about 0.075 to about 0.4 wt. %, or about 0.1 to about 0.3 wt. %, based on the total weight of the polymer composition.

If present in the polymer composition, the clarifying agent can be any suitable clarifying agent. In certain possibly preferred embodiments, the clarifying agent is selected from the group consisting of trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. In certain possibly preferred embodiments, the clarifying agent comprises an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the five remaining positions on the benzene ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively). In certain possibly preferred embodiments, the polymer composition comprises a clarifying agent of Formula (I).

If present in the polymer composition, the clarifying agent can be present in any suitable amount. As will be understood by those of ordinary skill in the art, the amount of clarifying agent suitable for use in the polymer composition will depend upon several factors, such as the composition of the clarifying agent and the desired optical properties of the polymer composition. For example, the clarifying agent can be present in the polymer composition in an amount of about 0.01 wt. % or more, about 0.05 wt. % or more, about 0.075 wt. % or more, or about 0.1 wt. % or more, based on the total weight of the polymer composition. The clarifying agent can be present in the polymer composition in an amount of about 1 wt. % or less, about 0.7 wt. % or less, about 0.6 wt. % or less, or about 0.5 wt. % or less. In certain possibly preferred embodiments, the clarifying agent is present in the polymer composition in an amount of from about 0.01 to about 1 wt. %, about 0.05 to about 0.7 wt. %, about 0.075 to about 0.6 wt. %, or about 0.1 to about 0.5 wt. %, based on the total weight of the polymer composition. Thus, in certain possibly preferred embodiments, such as when the clarifying agent comprises an acetal compound conforming to the structure of Formula (I) in which $R_1$ is an alkyl group (e.g., n-propyl), $R_2$, $R_3$, $R_5$, $R_6$, $R_7$, $R_8$, $R_{10}$, and $R_{11}$ are each hydrogen, $R_{12}$ is —$CHOHCH_2OH$, and $R_4$ and $R_9$ are each an alkyl group (e.g., n-propyl), the clarifying agent can be present in the polymer composition in an amount of from about 0.1 wt. % to about 0.5 wt. % (e.g., about 0.15 wt. % to about 0.45 wt. %). In certain other possibly preferred embodiments, such as when the clarifying agent comprises an acetal compound conforming to the structure of Formula (I) in which $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are each alkyl groups (e.g., methyl groups), the clarifying agent can be present in the polymer composition in an amount of from about 0.1 wt. % to about 0.3 wt. % (e.g., about 0.15 wt. % to about 0.25 wt. %).

The apparatus used in practicing the method of the invention can be any suitable extrusion blow molding apparatus. Suitable extrusion blow molding apparatus include continuous extrusion blow molding apparatus, such as rotary wheel extrusion blow molding apparatus and shuttle extrusion blow molding apparatus, and intermittent extrusion blow molding apparatus, such as reciprocating screw extrusion blow molding apparatus and accumulator head extrusion blow molding apparatus. As noted above, the apparatus includes a die through which the plasticized (molten) polymer composition is extruded to form a parison. The apparatus also includes a mold having a mold cavity. The mold cavity or the interior surfaces of the mold cavity defines the shape of the molded article to be produced by the apparatus. More specifically, the interior surfaces of the mold cavity define the exterior surfaces of the molded article produced by the apparatus.

The following examples further illustrate the subject matter described above but, of course, should not be construed as in any way limiting the scope thereof.

The following materials were used in the examples that follow:

Kraton G 1657 (from Kraton Polymers) 13% Styrene S-EB-S block copolymer
Kraton G 1652 (from Kraton Polymers) 30% Styrene S-EB-S block copolymer
Kraton G 1643 (from Kraton Polymers) 20% Styrene S-EB-S block copolymer
GH-893-1 Extruder mixed masterbatch of Kraton G 1652/ Kraton G 1657 (67/33)
GH-893-2 Extruder mixed masterbatch of Kraton G 1652/ Kraton G 1657 (50/50)
GH-893-3 Extruder mixed masterbatch of Kraton G 1652/ Kraton G 1657 (33/67)
Pro-Fax SA849S (from LyondellBasell) unclarified polypropylene random copolymer, MFI: 12 g/10 min.
M150N (from Sinopec-SK Wuhan) clarified polypropylene random copolymer, MFI: 15 g/10 min.
GM160E (from Sinopec Shanghai) unclarified polypropylene random copolymer, MFI: 1.6 g/10 min. EBM grade.
PPR-BT02 (from Sinopec Tianjin) clarified polypropylene random copolymer, MFI: 1.2 g/10 min. EBM grade. Contains Millad® NX8000 clarifying agent.
SR-20-NS (from Reliance) unclarified polypropylene random copolymer, MFI: 2 g/10 min. EBM grade.
Vistamaxx 6202 (from ExxonMobil Chemical), propylene ethylene copolymer, Poly Olefin Elastomer (POE)
Vistamaxx 3020FL (from ExxonMobil Chemical), propylene ethylene copolymer, Poly Olefin Elastomer (POE)
Millad NX8000K clarifying agent (from Milliken Chemical) Propyl sorbitol-based clarifying agent
ADK NA21 nucleating agent (from Asahi Denka) phosphate-based nucleating agent
Irgaclear XT386 clarifying agent (from BASF) Trisamide-based clarifying agent
PEG 1000: Polyethylene glycol 1000 (from Aldrich)
PEG 8000: Polyethylene glycol 8000 (from Aldrich)
Polyethylene [di(ethylene glycol) adipate] (PEDEGA): MW 500 (from Aldrich)
Polyethylenimine (PEI): MW: 3500 (from Gobekie Co., Ltd.)
Irganox® 1010 antioxidant (from BASF)
Irgafos® 168 antioxidant (from BASF)
Calcium stearate (CaSt)

Each of the polypropylene random copolymer compositions was compounded by blending the components in a Henschel high intensity mixer for approximately 1 minute at a blade speed of approximately 2,000 rpm. The samples were then melt compounded on Deltaplast single screw compounding extruder with a 25 mm screw diameter and length/diameter ratio of 30:1. The barrel temperature of the extruder was set to 230° C. The extrudate (in the form a strand) for each sample was cooled in a water bath and subsequently pelletized.

Pellets of each of the resulting polyolefin compositions were molded into plaques with dimensions of approximately 50 mm×75 mm with a thickness of 1.0 mm using an Arburg 50 ton injection molding machine. All molder barrel zones were set to 230° C., and the mold was cooled to 25° C. The polymer was injected into the mold cavity at 15 $cm^3$/sec. Plaque dimensions were verified with a micrometer after aging for 24 hours. The haze of the plaques was measured in accordance with ASTM Standard D1103-92 using a BYK-Gardner Haze-Guard Plus. The results of these measurements were reported in % haze.

Notched Izod Impact testing was performed at 23° C., 0° C., −5° C. and −20° C. on notched 4 mm thick injection molded bars in accordance with ISO Standard 180. The results were reported in KJ/$m^2$.

Gardner drop impact testing was performed at 23° C., 0° C., −5° C. and −20° C. on injection molded plaques in accordance with ASTM D 5420. The results were reported in joules (J) as Mean Failure Energy.

Flexural Modulus testing was performed at 23° C. on injection molded bars in accordance with ISO Standard 178. The results were reported in MPa.

Example 1

Seven polymer compositions were produced in accordance with the general procedure described above. These polymer compositions were then injection molded into plaques using the procedure described above. The formulation of each polymer composition is set forth in Table 1. Table 1 also sets forth haze and Izod impact testing for the polymer compositions.

TABLE 1

Composition and physical properties of Samples 1-7.

| | Sample | | | | | | |
|---|---|---|---|---|---|---|---|
| | 1 | 2 | 3 | 4 | 5 | 6 | 7 |
| SA849 | 793.7 | 794.7 | 795.7 | 795.6 | 795.6 | 795.6 | 795.6 |
| G1652 | 200 | 200 | 200 | 200 | 200 | 200 | 200 |
| NX8000K | 4.0 | 3.0 | 2.0 | 2.0 | 2.0 | 2.0 | 2.0 |
| PEG1000 | | | | 0.1 | | | |
| PEG8000 | | | | | 0.1 | | |
| PEDEGA | | | | | | 0.1 | |
| PEI | | | | | | | 0.1 |
| 1010 | 0.5 | 0.5 | 0.5 | 0.5 | 0.5 | 0.5 | 0.5 |
| 168 | 1.0 | 1.0 | 1.0 | 1.0 | 1.0 | 1.0 | 1.0 |
| CaSt | 0.8 | 0.8 | 0.8 | 0.8 | 0.8 | 0.8 | 0.8 |
| | Physical Properties | | | | | | |
| Haze (%) | 12.91 | 15.15 | 24.08 | 20.45 | 21.24 | 21.10 | 18.29 |
| Izod (RT) | 40.75 | 41.16 | 43.37 | 42.29 | 41.97 | 42.48 | 42.54 |
| Izod (−20° C.) | 2.89 | 2.43 | 2.26 | 2.13 | 2.21 | 2.22 | 2.22 |

As can be seen from the data in Table 1, the addition of the co-additive significantly reduced the haze of the polymer composition without deleteriously affecting the impact strength.

Example 2

Eight polymer compositions were produced in accordance with the general procedure described above. These polymer compositions were then injection molded into plaques using the procedure described above. The formulation of each polymer composition is set forth in Table 2. Table 2 also sets forth haze and Gardner impact testing for the polymer compositions.

TABLE 2

Composition and physical properties of Samples 8-15.

| | Sample | | | | | | | |
|---|---|---|---|---|---|---|---|---|
| | 8 | 9 | 10 | 11 | 12 | 13 | 14 | 15 |
| M150N | 90% | 80% | 80% | 80% | 80% | 80% | 80% | 80% |
| G1652 | 10% | 20% | | | | | | |
| GH893-1 | | | 10% | 20% | | | | |
| GH893-2 | | | | | 20% | | | |
| GH893-3 | | | | | | 20% | | |
| 6202 | | | | | | | 10% | 20% |
| NX8000K(ppm) | 1000 | 1000 | 1000 | 1000 | 1000 | 1000 | 1000 | 1000 |
| | Physical Properties | | | | | | | |
| 1 mm Haze (%) | 13.92 | 17.84 | 8.58 | 9.36 | 11.17 | 14.92 | 5.89 | 6.38 |
| Gardner Impact −5° C. (J) | 0.3 | 12.9 | 0.3 | 12.7 | 12.6 | 12.4 | 0.3 | 1.7 |

These results show that styrene-ethylene/butylene-styrene block copolymers generally provide better impact performance than a polyolefin elastomer at higher loadings (e.g., 20%).

Example 3

Seven polymer compositions were produced in accordance with the general procedure described above. These polymer compositions were then injection molded into plaques using the procedure described above. The formulation of each polymer composition is set forth in Table 3. Table 3 also sets forth haze, Izod impact, and Gardner impact testing for the polymer compositions.

TABLE 3

Composition and physical properties of Samples 16-22.

| | Sample | | | | | | |
|---|---|---|---|---|---|---|---|
| | 16 | 17 | 18 | 19 | 20 | 21 | 22 |
| GM160E (%) | 100 | 90 | 85 | 80 | 90 | 85 | 80 |
| G1643 (%) | | 10 | 15 | 20 | | | |
| 3020FL (%) | | | | | 10 | 15 | 20 |
| NX800K (ppm) | 3000 | 3000 | 3000 | 3000 | 3000 | 3000 | 3000 |
| Physical Properties | | | | | | | |
| 1 mm Haze (%) | 8.93 | 7.83 | 7.20 | 6.75 | 7.48 | 7.18 | 6.87 |
| Izod Impact at RT(KJ/m$^2$) | 8.73 | 35.45 | 47.62 | 53.29 | 15.93 | 19.04 | 25.09 |
| Izod Impact at 0° C.(KJ/m$^2$) | 3.14 | 4.81 | 6.73 | 45.02 | 3.09 | 3.36 | 3.44 |
| Izod Impact at −5° C.(KJ/m$^2$) | 1.72 | 1.81 | 1.80 | 1.83 | 1.87 | 1.68 | 1.68 |
| Gardner Impact at RT (J) | 7.6 | 8.4 | 12.7 | 10.7 | 7.6 | 8.5 | 8.9 |
| Gardner Impact at 0° C. (J) | 0.7 | 13.0 | 13.2 | 12.5 | 0.8 | 1.5 | 2.4 |
| Gardner Impact at −5° C. (J) | 0.5 | 1.0 | 13.1 | 14.2 | 0.7 | 0.7 | 0.6 |
| Flexural Modulus (MPa) | 1055 | 748 | 631 | 556 | 814 | 749 | 688 |

These results also show that styrene-ethylene/butylene-styrene block copolymers generally provide better impact performance than a polyolefin elastomer.

Example 4

Four polymer compositions were produced in accordance with the general procedure described above. These polymer compositions were then injection molded into plaques using the procedure described above. The formulation of each polymer composition is set forth in Table 4. Table 4 also sets forth haze, Izod impact, and Gardner impact testing for the polymer compositions.

TABLE 4

Composition and physical properties of Samples 23-26.

| | Sample | | | |
|---|---|---|---|---|
| | 23 | 24 | 25 | 26 |
| SA849 (%) | 80 | 80 | 80 | 80 |
| G1643 (%) | 20 | | 20 | |
| 6202 (%) | | 20 | | 20 |
| NA21 (ppm) | 2000 | 2000 | | |
| XT386 (ppm) | | | 200 | 200 |
| Physical Properties | | | | |
| 1 mm Haze (%) | 8.19 | 10.39 | 6.21 | 7.01 |
| Izod Impact at RT (KJ/m$^2$) | 40.09 | 39.3 | 41.14 | 30.84 |
| Izod Impact at −5° C. (KJ/m$^2$) | 4.79 | 3.76 | 3.14 | 3.06 |
| Gardner Impact at −5° C. (J) | 12.6 | 3.1 | 12.0 | 2.3 |

These results show that desirably low haze levels can be achieved using clarifying agents other than acetal-based clarifiers. These results also show that styrene-ethylene/butylene-styrene block copolymers generally provide better impact performance than a polyolefin elastomer.

Example 5

Nine polymer compositions were compounded in accordance with the general procedure described above. The formulation of each polymer composition is set forth in Table 5.

Following compounding, each polymer composition was used to produce 1 L bottles on a Dekuma DKM-B8 single-station extrusion blow-molding machine. The blow-molding machine had a 40 mm screw diameter, a length/diameter ratio of 25:1, and a smooth barrel. For Samples 27-31, the barrel temperature was approximately starting at 170° C. and ending at 180° C., with the extrusion head maintained at a temperature of approximately 180° C. The molten polymer parison was extruded at a 180° C. melt temperature into a blow mold that was maintained at a mold temperature of approximately 25° C. For Samples 32-35, the barrel temperature was approximately starting at 160° C. and ending at 170° C., with the extrusion head maintained at a temperature of approximately 170° C. The molten polymer parison was extruded at a 170° C. melt temperature into a blow mold that was maintained at a mold temperature of approximately 25° C. The final polypropylene bottles weighed approximately 60 grams.

The resulting bottles were then tested as described below. The percent haze for the side wall of the bottles was measured in both sides in accordance with ASTM Standard D1103-92 using a BYK-Gardner Haze-Guard Plus. The top load of bottles was measured in accordance with ASTM D2659-11 using an Instron 5965 material testing system. The bottle drop test was performed in accordance with ASTM D2463 Procedure B Bruceton Staircase method. The results of this testing are set forth in Table 5.

TABLE 5

Composition and physical properties of Samples 27-35.

| | Samples | | | | | | | | |
|---|---|---|---|---|---|---|---|---|---|
| | 27 | 28 | 29 | 30 | 31 | 32 | 33 | 34 | 35 |
| PPR-BT02 (%) | 100 | 80 | 80 | 80 | 80 | | | | |
| SR-20-NS | | | | | | 80 | 80 | 80 | 80 |
| G1643 (%) | | 20 | 20 | 20 | | | | | |
| 3020FL (%) | | | | | 20 | 20 | 20 | 20 | 20 |
| NX8000K (ppm) | | | | | | 2000 | 3000 | | |
| NA21 (ppm) | | | | | | | | 2000 | |
| XT386 (ppm) | | | | | | | | | 200 |
| PEG1000 (ppm) | | 100 | | | | | | | |
| PEI (ppm) | | | 100 | | | | | | |
| Physical Properties | | | | | | | | | |
| Bottle Haze 1 (%) | 15.6 | 14.5 | 13.8 | 16.4 | 17.5 | 24.8 | 22.3 | 28.1 | 59.8 |
| Bottle Haze 2 (%) | 13.9 | 18.9 | 20.1 | 15.4 | 13.6 | 19.5 | 18.5 | 26.9 | 55.4 |
| Top Load (N) | 523 | 297 | 310 | 303 | 373 | 371 | 392 | 449 | 387 |
| Bottle Drop Test at 0° C. (Mean Failure Height) | 80.83 | 175.5 | 176.3 | 202.5 | 161.9 | 189 | 160.8 | 161.3 | 180.3 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An additive composition comprising:
   (a) a plurality of first particles, the first particles comprising about 95 wt. % or more an impact modifier selected from the group consisting of styrene-butadiene block copolymers, styrene-ethylene/butylene-styrene block copolymers, styrene-ethylene/propylene-styrene block copolymers, and mixtures thereof; and
   (b) a plurality of second particles, the second particles comprising:
      (i) about 20% wt. to about 80% wt, based on the total weight of the second particles, of a polypropylene random copolymer, wherein the random copolymer is made by the polymerization of propylene and about 1 wt. % to about 7 wt. % of a comonomer selected from the group consisting of ethylene, but-1-ene, and hex-1-ene;
      (ii) about 20% wt. to about 80% wt, based on the total weight of the second particles, of an acetal compound of Formula (I):

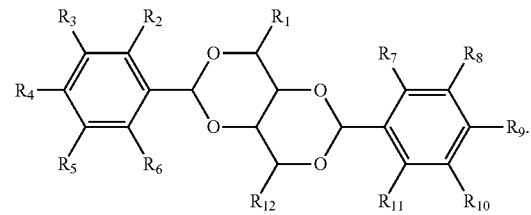

(Formula I)

wherein $R_1$ is selected from the group consisting of hydrogen, alkyl groups, alkenyl groups, hydroxyalkyl groups, alkoxy groups, alkyl halide groups, and derivatives thereof; $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, carboxyl groups, and halogens; and $R_{12}$ is a hydroxyalkyl group selected from the group consisting of —$CH_2OH$ and —$CH(OH)CH_2OH$; and (iii) about 4% wt. to about 80% wt, based on the total weight of the second particles, of a co-additive compound selected from the group consisting of a poly[di(ethylene glycol) adipate] having a molar mass of about 300 g/mol to about 10,000 g/mol, a branched polyethyleneimine having a molar mass of about 1,000 g/mol to about 10,000 g/mol, and mixtures thereof.

2. The additive composition of claim 1, wherein the impact modifier is a styrene-ethylene/butylene-styrene block copolymer.

3. The additive composition of claim 1, wherein $R_1$ is selected from the group consisting of alkyl groups, alkenyl groups, and alkoxy groups.

4. The additive composition of claim 1, wherein $R_1$ is selected from the group consisting of alkyl groups and alkenyl groups, $R_2$, $R_3$, $R_5$, $R_6$, $R_7$, $R_8$, $R_{10}$, and $R_{11}$ are each hydrogen, $R_{12}$ is —$CH(OH)CH_2OH$, and $R_4$ and $R_9$ are each alkyl groups.

5. The additive composition of claim 4, wherein $R_1$ is an n-propyl group, $R_2$, $R_3$, $R_5$, $R_6$, $R_7$, $R_8$, $R_{10}$, and $R_{11}$ are each hydrogen, $R_{12}$ is —$CH(OH)CH_2OH$, and $R_4$ and $R_9$ are each n-propyl groups.

6. The additive composition of claim 1, wherein the comonomer is ethylene.

7. The additive composition of claim 1, wherein the branched polyethylenimine has a molar mass of about 2,500 g/mol to about 5,000 g/mol.

* * * * *